No. 698,066. Patented Apr. 22, 1902.
C. W. SLEEPER.
SIDE SEAMING MACHINE.
(Application filed Feb. 12, 1901.)
(No Model.) 6 Sheets—Sheet 1.
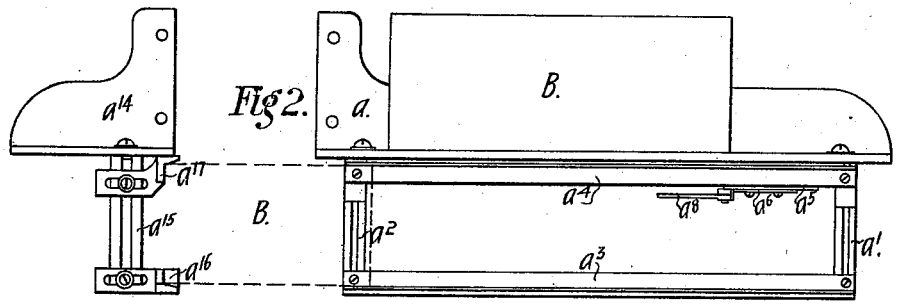
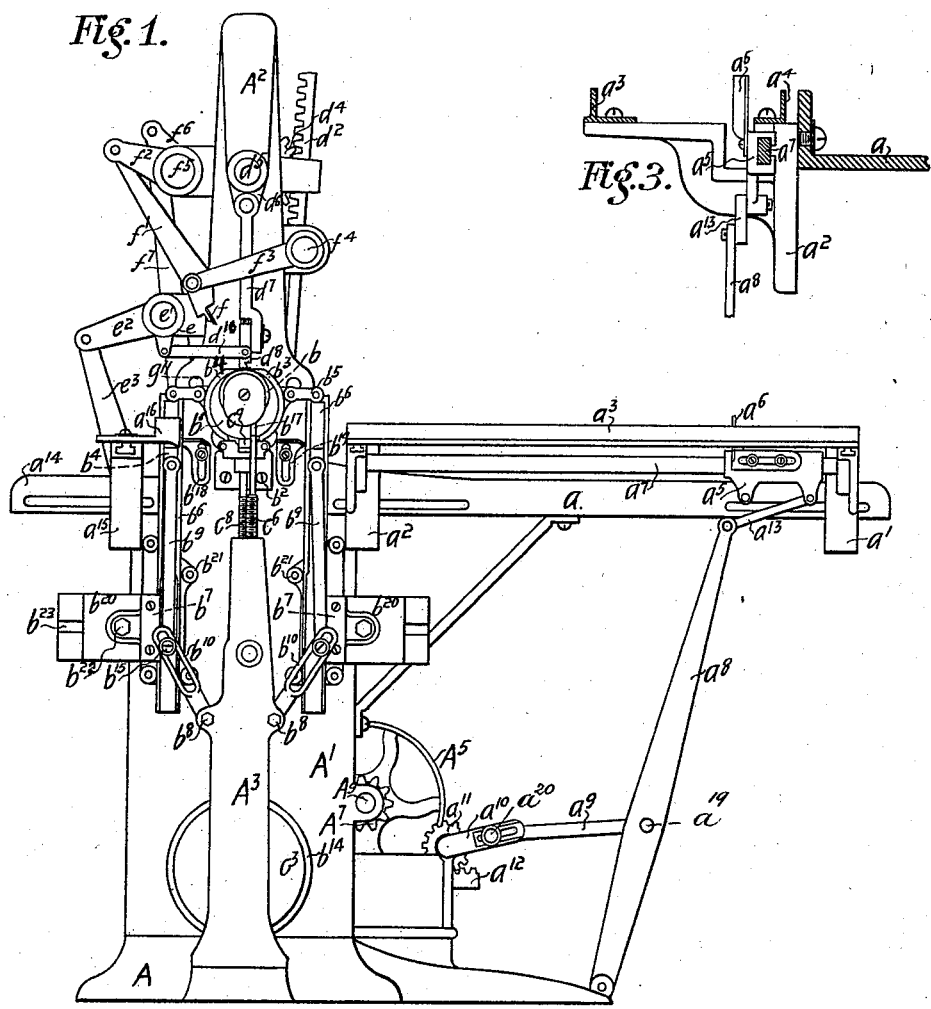
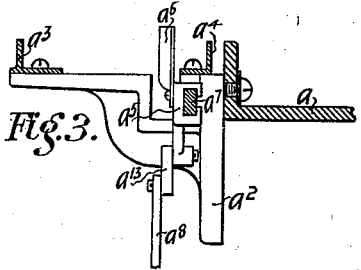
Witnesses
Alfred B. Kittson
Ralph W. Frost
Inventor:
Charles W. Sleeper
by his attorney
Charles W. Reed No. 698,066. Patented Apr. 22, 1902.
C. W. SLEEPER.
SIDE SEAMING MACHINE.
(Application filed Feb. 12, 1901.)
(No Model.) 6 Sheets—Sheet 2.
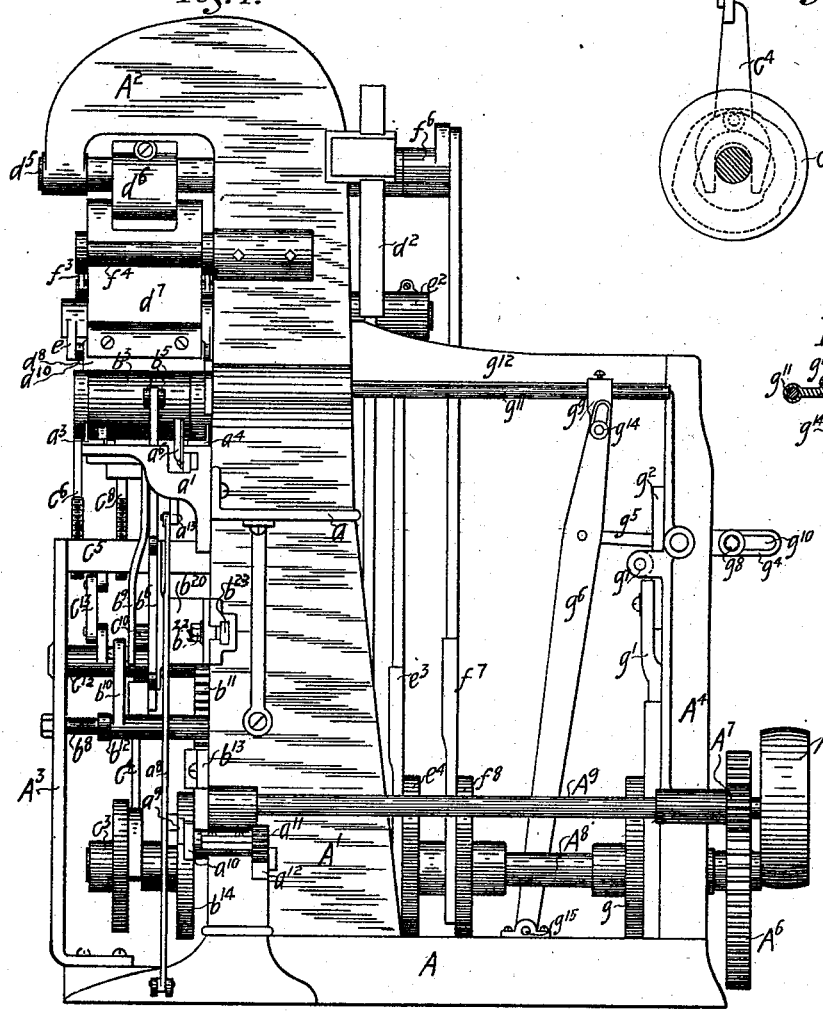
Witnesses.
Alfred D. Kittson
Ralph W. Fisher
Inventor.
Charles W. Sleeper
by his attorney
Charles Reed

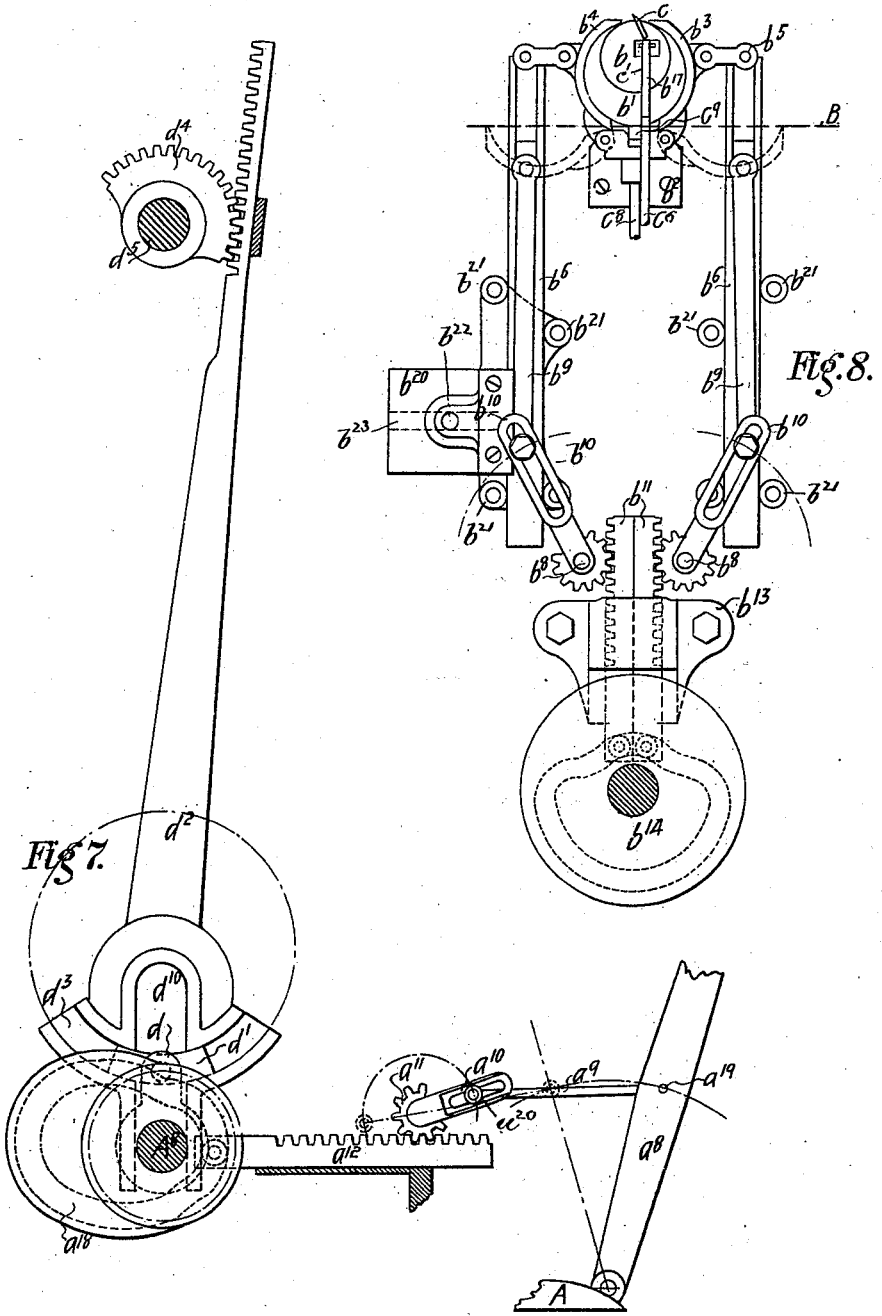

No. 698,066. Patented Apr. 22, 1902.
C. W. SLEEPER.
SIDE SEAMING MACHINE.
(Application filed Feb. 12, 1901.)
(No Model.) 6 Sheets—Sheet 4.

Witnesses.
Alfred B. Kittson
Ralph W. Foote

Inventor.
Charles W. Sleeper
by his attorney
Chas. W. Reed

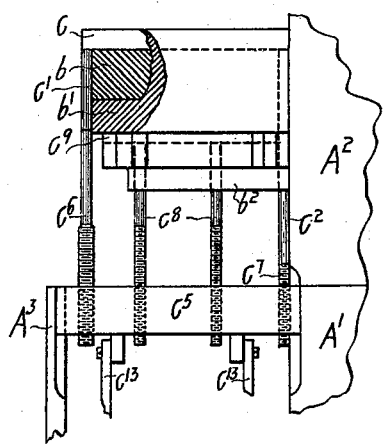

No. 698,066. Patented Apr. 22, 1902.
C. W. SLEEPER.
SIDE SEAMING MACHINE.
(Application filed Feb. 12, 1901.)
(No Model.) 6 Sheets—Sheet 6.
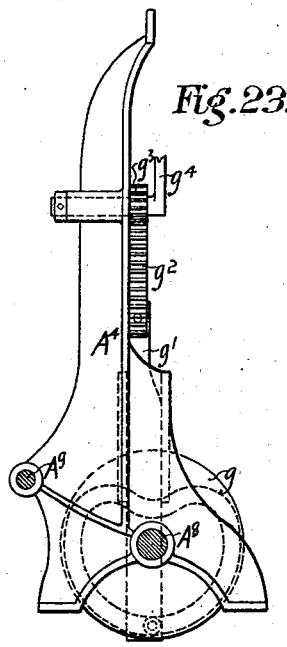
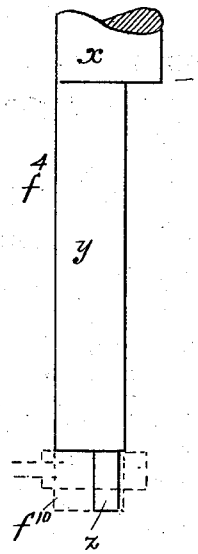
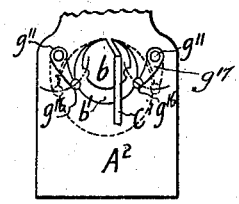
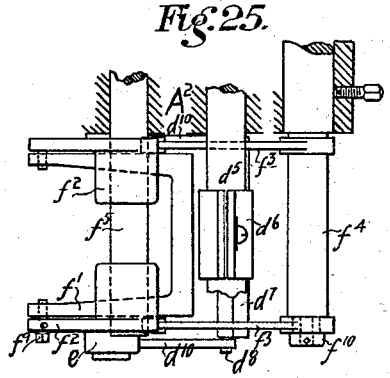
Witnesses
Alfred B. Kittson
Ralph W. Foster
Inventor.
Charles W. Sleeper
by his attorney
Charles W. Reed
THE NORRIS PETERS CO., PHOTO-LITHO., WASHINGTON, D. C.

UNITED STATES PATENT OFFICE.

CHARLES W. SLEEPER, OF LANCASTER, NEW HAMPSHIRE, ASSIGNOR, BY MESNE ASSIGNMENTS, TO AMERICAN CAN COMPANY, OF JERSEY CITY, NEW JERSEY, A CORPORATION OF NEW JERSEY.

SIDE-SEAMING MACHINE.

SPECIFICATION forming part of Letters Patent No. 698,066, dated April 22, 1902.

Application filed February 12, 1901. Serial No. 46,999. (No model.)

*To all whom it may concern:*

Be it known that I, CHARLES W. SLEEPER, a subject of the King of Great Britain and Ireland, residing at Lancaster, in the county of Coos and State of New Hampshire, have invented certain new and useful Improvements in Side-Seaming Machines, of which the following is a specification.

My invention has special relation to improvements in the side-seaming machine for which I obtained Letters Patent of the United States No. 585,635, dated June 29, 1897; and it consists in certain details of construction which render the machine easier of adjustment and more positive in its action. These improvements consist specifically, first, in the use of adjustable guides for carrying the guide-rolls; second, in certain improvements in the devices for raising and supporting the knife-die and holding the can-body blank against the mandrel; third, in improved mechanism for operating the upper dies and adjusting their position with relation to the knife-die.

Figure 9:
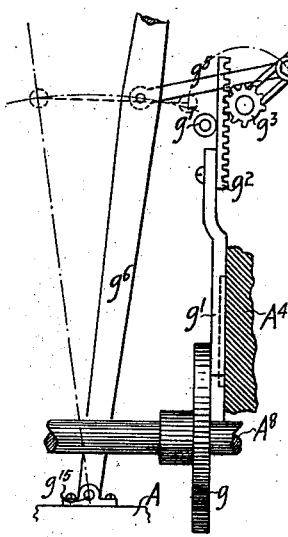
Figure 10:
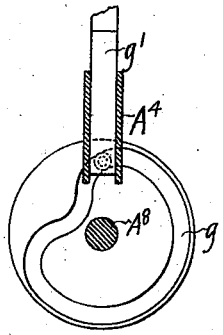
Figure 15:
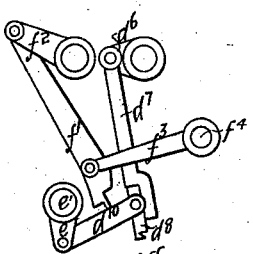
Figure 12:
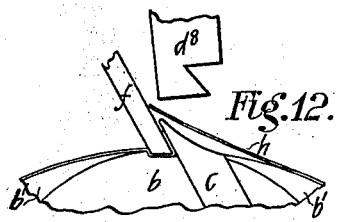

In the drawings annexed to this specification, Figure 1 is a front view of the entire machine. Fig. 2 is a detail plan of the tin-feeding table and guides. Fig. 3 is an end view of the tin-feeding mechanism. Fig. 4 is a side view of the machine. Fig. 5 is a detail of mechanism for raising the lower die or knife. Fig. 6 is a detail of ejector mechanism. Fig. 7 is a detail of mechanism for operating the tin-feed lever and the shaft $d^5$. Fig. 8 is a detail of forming device and mechanism for operating the same. Fig. 9 is a detail of the mechanism for operating the ejectors. Fig. 10 is a detail of ejector-cam and cam-rod. Figs. 11, 12, 13, and 14 are details showing the seam in different stages of formation. Figs. 15, 16, 17, and 18 are details showing the action of the upper die and tucker in forming the seam. Fig. 19 is a detail showing the manner of supporting the knife-die. Fig. 20 is a detail showing the means for adjusting the position of the upper dies with relation to the lower die. Fig. 21 is a detail showing the tucker-cam and cam-rod. Fig. 22 is a detail of the die-cam and cam-rod. Fig. 23 is a detail showing the standard $A^4$ with a portion of the mechanism for operating the ejectors. Fig. 24 is a detail giving an end view of the ejectors and showing the method of adjusting the ejectors for cans of different sizes. Fig. 25 is a detail giving a top view of the mechanism for operating and adjusting the upper dies. Fig. 26 is a detail showing the form of the eccentric-shaft $f^4$.

A is the base of the machine.

A' is a column secured to the base A and having a projecting head $A^2$.

$A^3$ is a standard secured to the base A at the front of the machine.

$A^4$ is a standard secured to the base A at the rear of the machine and provided with journal-boxes for shafts $A^8$ $A^9$.

$A^9$ is a shaft carrying the driving-pulley $A^5$ and pinion $A^7$, which engages a gear $A^6$ on the cam-shaft $A^8$. The cam-shaft $A^8$ passes through the column A' and carries all the cams by which the various movements are effected.

Referring to Figs. 1, 2, 3, and 4, $a$ is a table secured to the column A' for carrying the tin plates to be used in forming the can-bodies. $a'$ $a^2$ are T-slotted brackets secured to the table $a$ by screws passing through suitable slots in the flange of the table and capable of both vertical and horizontal adjustment. $a^3$ and $a^4$ are angle-iron guides adjustably secured to the brackets $a'$ $a^2$ by suitable screw-bolts, which engage T-slots in the tops of said brackets. $a^5$ is a block carrying the feed-finger $a^6$ and sliding on a bar $a^7$, secured to the brackets $a'$ $a^2$. The block $a^5$ is connected by a link $a^{13}$ to a lever $a^8$, pivoted at its lower end to the base of the machine and connected by a link $a^9$, pivoted to said lever $a^8$ by the pin $a^{19}$, to the slotted crank $a^{10}$, a projecting stud $a^{20}$ on the end of said link $a^9$ engaging a slot in said crank $a^{10}$. (See Figs. 1 and 7.) An oscillating movement is given to the crank $a^{10}$ by means of the pinion $a^{11}$, engaged by the rack $a^{12}$, to which reciprocating motion is given by the cam $a^{18}$. Dotted lines, Fig. 7, show the position of the crank $a^{10}$ and lever $a^8$ at the inner throw of the crank, at which point the crank and link $a^9$ should be upon a dead-center—that is, the center of the crank-shaft, the stud $a^{20}$, and the pin $a^{19}$ should be in a straight line—by which arrangements a slight variation in the position of the rack $a^{12}$ due to the wearing of the parts or otherwise will not materially affect the position of the lever $a^8$ nor the accuracy of the feeding mechanism. $a^{14}$ is a bracket secured to the top of the column A' and opposite the table $a$. $a^{15}$ is a T-slotted bracket secured to the bracket $a^{14}$ and provided with means for vertical and horizontal adjustment. $a^{16}$ $a^{17}$ are stop-guides adjustably secured to the bracket $a^{15}$ and presenting a flaring recess to the sheets of tin B as they are pushed forward between the guides $a^3$ $a^4$, the bottom of said recess being just wide enough to receive and hold the sheets, whereby the sheets are accurately alined before being acted upon by the forming mechanism.

Referring to Figs. 1, 4, and 8, $b$ is a cylindrical steel mandrel or seaming-horn projecting from the face of the head $A^2$. $b'$ is an eccentric-sleeve fitted to the mandrel $b$ and having an outer diameter equal to the inside diameter of the can to be made. The mandrel $b$ is of the diameter of the smallest can to be made on the machine. For all larger sizes sleeves $b'$ of a corresponding size are provided. When in use, the sleeve $b'$ is rigidly attached to the mandrel, and in this specification when reference is made to the mandrel it will be understood as including also the sleeve $b'$ unless otherwise specified. $b^2$ is a bracket secured to the head $A^2$. $b^3$ $b^4$ are wings hinged to the bracket $b^2$ and adapted to wrap the body-blank of a can around the mandrel. $b^5$ $b^5$ are links connecting the wings $b^3$ $b^4$ with sliding bars $b^6$ $b^6$, which are arranged to move vertically between guide-rolls $b^{21}$ $b^{21}$, projecting from the guide-plates $b^{20}$ $b^{20}$. These guide-plates $b^{20}$ are provided with ribs on their under sides engaging the transverse slots $b^{23}$ in the face of the column A' and are adjustably secured thereto by bolts $b^{22}$, passing through said slots and connecting the guide-plates with the column A'. By this arrangement the distance between the sliding bars $b^6$ is readily adjusted to enable the machine to operate on cans of different sizes, the whole set of guide-rolls $b^{21}$ on each side of the machine being moved laterally at once and released and secured by the operation of a single bolt $b^{22}$. $b^9$ $b^9$ are links pivoted at their upper ends to the sliding bars $b^6$ $b^6$ and having at their lower ends studs working in slotted arms $b^{10}$ $b^{10}$, which move about the stationary shafts $b^8$ $b^8$, connecting the column A' and the standard $A^3$. The arms $b^{10}$ are provided with segment-gears at their inner ends, engaged by racks $b^{11}$, working in a guide $b^{13}$ and acted upon by a cam $b^{14}$ by means of suitable pins and rollers carried by the racks and entering the groove in said cam.

Referring to Figs. 1, 4, 5, 8, 19, and 20, $c$ is a thin-edged die, called a "knife," loosely fitted in a slot in the mandrel $b$, so that its face is at an angle of about thirty degrees with the perpendicular. This knife rests upon the top of suitable pins $c'$ $c^2$. The pin $c'$ passes down nearly through the mandrel and is prevented from falling out when unsupported by an enlargement at the top, which strikes against a corresponding shoulder in the socket $b^{17}$, in which the pin $c'$ works. The pin $c^2$, near the back of the mandrel, passes through the mandrel and through the bracket $b^2$. $c^5$ is a sliding beam guided in suitable grooves in the column A' and standard $A^3$ and carrying the adjustable screw-rods $c^6$ $c^7$ $c^8$ $c^8$, projecting from its upper surface. When the beam is raised, the rods $c^6$ and $c^7$ strike against the lower ends of the pins $c'$ and $c^2$, respectively, thereby raising the knife $c$, which rests upon the pins, and rigidly supporting it while the seam is being formed upon the can. $c^9$ is a bar or key resting upon the top of the bracket $b^2$ and designed to be raised by the screw-rods $c^8$ $c^8$, which pass through the bracket $b^2$ in order to hold the can-body firmly against the mandrel. $c^{10}$ is a rack, to which vertical reciprocating motion is given by means of the cam $c^3$ and the cam-rod $c^4$, the rack being guided by roll $c^{11}$ on a pin projecting from the face of the column A'. $c^{12}$ is a rock-shaft with one end journaled in the face of the column A' and the other end in the standard $A^3$. The rock-shaft $c^{12}$ is furnished with a segment of gear-teeth $c^{15}$, which are engaged by the rack $c^{10}$, and with two projecting ears $c^{14}$, which are connected to the beam $c^5$ by the links $c^{13}$ $c^{13}$. Raising the cam-rod $c^4$ causes the rock-shaft $c^{12}$ to move to the position shown by dotted lines in Fig. 5, the links $c^{13}$ acting as toggles to raise the beam $c^5$ and forming a rigid support for it when raised.

Referring to Figs. 1, 4, and 7, $d$ is a crank upon the shaft $A^8$. $d'$ is a segment-shaped block pivoted to the crank. $d^2$ is a forked rod arranged to embrace the shaft and provided with a segmental groove $d^3$, so arranged that the block $d'$ may move along the groove and across the open space between the points of the fork, as shown in Fig. 7. The upper end of the rod $d^2$ terminates in a rack which engages a segment-gear $d^4$ upon a rock-shaft $d^5$, which passes through the head $A^2$. $d^6$ is an arm secured to the shaft $d^5$. $d^7$ is a double link secured to the die $d^8$ and connecting the same with the arm $d^6$. As the shaft $A^8$ revolves the crank $d$ carries the block $d'$ along the groove $d^3$ and across the opening $d^{10}$, (above the shaft during the upper part of the stroke and below the shaft during the lower half of the stroke,) giving an irregular or quick return motion to the rod $d^2$, the rod moving faster during the upper half of the stroke, when the shaft $A^8$ lies outside the curve of groove $d^3$ and the block $d'$ acts upon the convex side of the groove, and slower during the lower half of the stroke, when the shaft lies within the curve of groove $d^3$ and the block $d'$ acts upon the concave side of said groove. The arm $d^6$ oscillates between the position shown in Fig. 15 and that shown in Fig. 18, and in making these oscillations the point of connection with the link $d^7$ passes the vertical line twice during each complete oscillation. It is obvious, therefore, that the die $d^8$ will descend upon the mandrel twice during each revolution of the shaft $A^8$. Referring to Figs. 1, 4, 20, and 25, the die $d^8$, secured to the lower end of the link $d^7$, is guided by links $d^{10}$, connecting it with arms $e\ e$ on a rock-shaft $e'$, journaled in a suitable projection on the side of the head $A^2$ and operated by an arm $e^2$, cam-rod $e^3$, and cam $e^4$, by which a horizontal movement is communicated to the said die $d^8$. In order to insure accurate work, it is essential that the die $d^8$ should be exactly parallel to the knife-die $c$. To effect this result and to provide for slight variations due to inaccuracies of construction, wear, or warping of the parts, one of the arms $e\ e$ is provided with an eccentric-pin $e^5$, Fig. 20, to receive the corresponding link $d^{10}$. By turning this eccentric-pin in its socket the position of the corresponding end of the die $d^8$ is changed and the alinement of the die with the knife-die $c$ is regulated. $f$ is a tucking-die of substantially the same length as the die $d^8$ and mounted upon a frame $f'$, which is pivoted to two arms $f^2$ and guided by links $f^3$, which connect the frame $f'$ with an eccentric-shaft $f^4$, Figs. 20, 25, 26, projecting from the head $A^2$. The arms $f^2$ are attached to a rock-shaft $f^5$, to which is also secured an arm $f^6$, connected to a cam-rod $f^7$ and operated by a cam $f^8$ on the shaft $A^8$, Figs. 4, 21. $f^9$ is a pin secured to one side of the frame $f'$ and inserted in a slot in one of the arms $f^2$, thereby pivotally connecting the said frame and arm, the other side of said frame and the corresponding arm being also connected by a like pin. $f^{11} f^{11}$ are set-screws for regulating the position of the pin $f^9$ in said slot. The eccentric-shaft $f^4$, Figs. 4, 20, 25, 26, is shown in detail in Fig. 26, but somewhat out of scale, as the variations in adjustment for which it is intended to provide are very slight. The part $x$ is seated in a cylindrical socket in the head $A^2$, as shown particularly in Fig. 4. The part $y$, which is embraced by one of the links $f^3$, is turned on a center different from that of the part $x$, and the part $z$, forming a pin at the end of the shaft, is concentric with the part $x$. On the pin $z$ is mounted an eccentric $f^{10}$, which is embraced by the other link $f^3$ and which is normally concentric with the part $y$ and is then substantially a continuation thereof, but assumes a position eccentric to it when moved about the pin $z$. By moving the eccentric on the pin $z$ the corresponding link $f^3$ is acted upon and that end of the die $f$ is brought nearer to or farther from the die $c$, thereby changing the relative alinement of the two dies. By turning the whole shaft $f^4$ about in its socket in the head $A$ both links $f^3$ are affected alike, and the distance between the dies $f$ and $c$ is thereby changed.

Referring to Figs. 4, 6, 9, 10, and 24, $g$ is a cam on the cam-shaft $A^8$. $g'$ is a cam-rod guided between suitable projecting ribs on the face of the standard $A^4$ and carrying a rack $g^2$, which engages a segment-gear $g^3$ on a slotted arm $g^4$, mounted on a short shaft journaled in the standard $A^4$. $g^5$ is a link connecting the arm $g^4$ with the lever $g^6$, pivoted to the base $A$ of the machine. $g^7$ is a guide-roll mounted on a pin projecting from the standard $A^4$ and acting to hold the rack $g^2$ in engagement with the segment-gear $g^3$. $g^8$ is a shoulder-stud passing through the slot $g^{10}$ in the arm $g^4$ and screwed to the link $g^5$, whereby the relative position of the arm $g^4$ and link $g^5$ may be adjusted. $g^9$ is a crosshead sliding upon the guide $g^{12}$. $g^{11} g^{11}$ are ejector-rods adjustably secured to the crosshead $g^9$. $g^{13}$ is a cleat secured to the crosshead $g^9$ and holding the same in contact with the guide $g^{12}$. $g^{14}$ is a pin and roller on a projecting ear of the cross-head $g^9$ and engaged by a slot in the lever $g^6$. $g^{15}$ is a pivot on which the lever $g^6$ works. Upon the ends of the ejector-rods $g^{11}$ are arms $g^{17}$, Fig. 24, terminating in circular projections $g^{16} g^{16}$, designed to enter suitable grooves in the mandrel $b\ b'$ and push off the finished can. The ejector-rods are so placed that the arc described by the projections $g^{16}$ when moved about the center of the ejector-rod will intersect the surface of the mandrel $b$ nearly at the intersection of its horizontal diameter with its surface, and the grooves in the sleeve $b'$ are so placed as to also intersect this arc, so that one pair of ejectors may serve to eject cans of all sizes within the capacity of the machine.

Figure 11:
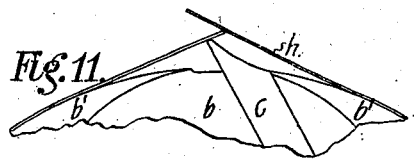
Figure 13:
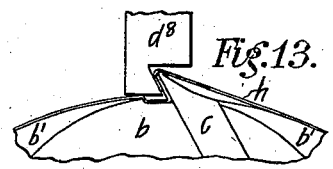
Figure 14:
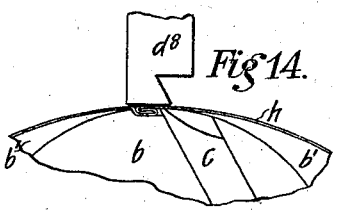
Figure 16:
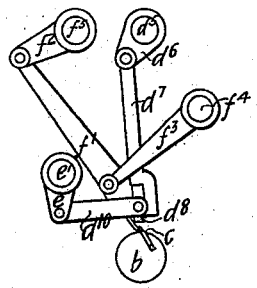
Figure 17:
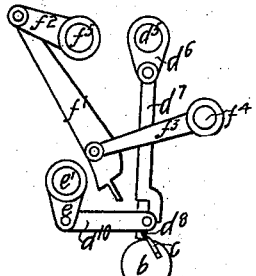
Figure 18:
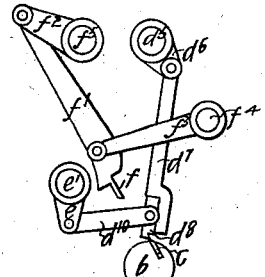

In operation the body-blanks B are placed in a pile upon the table $a$. The operator takes them one at a time and places them on the guides $a^3\ a^4$, when they are pushed forward by the finger $a^6$ between the mandrel and the key $c^9$, as shown by dotted lines, Fig. 8, the forward end of the body-blank being guided and held in place by the stop-guides $a^{16}\ a^{17}$, as shown by dotted lines, Fig. 2. The cam-rod $c^4$ then rises, causing the knife $c$ to project above the mandrel, at the same time forcing the key $c^9$ upward against the body-blank and pressing the same against the mandrel. The wings $b^3 b^4$ then move from the position shown by dotted lines, Fig. 8, to position shown by full lines, thus wrapping the can-body blank around the mandrel. The rack $b^{11}$ being operated by the same cam, one moves a little in advance of the other, insuring the uniform overlapping of the ends of the can-body blank, as shown in Fig. 11. The tucking-die $f$ now descends to the position shown in Figs. 12 and 16, bending the underlapping end of the body-blank and forming a hook upon it, and as the tucking-die returns to its former position the upper die $d^8$, being moved vertically by the arm $d^6$ and laterally by the arms $e\ e$, bends the overlapping end of the body-blank over the knife-die $c$ and presses it into the angle formed by the upturned underlapping end, the two ends being loosely hooked together, as shown in Fig. 13. The upper die $d^8$ is then moved to a position above the knife-die $c$, the arm $d^6$ having reached one extremity of its movement, and on the return motion of the arm $d^6$ the die $d^8$ descends to position shown in Fig. 14, crushing the seam, the knife-die $c$ being arranged to descend as the same is crushed. The wings $b^3$ $b^4$ are then moved to positions shown by dotted lines, Fig. 8, and the can-body is pushed off from the mandrel by the ejectors $g^{11}$.

Having by the direction of the Commissioner of Patents divided my application as originally filed, I limit my claims in this application to a portion only of the improvements hereinbefore described, but do not thereby abandon my right to obtain Letters Patent for other improvements herein described, but not claimed, it being my intention to file separate applications for Letters Patent therefor.

What I claim, and desire to secure by Letters Patent, is—

1. In a side-seaming machine the guide-plates $b^{20}$ carrying guide-rolls $b^{21}$ and provided with projecting ribs engaging transverse slots $b^{23}$ in the column A' and capable of lateral adjustment by means of said slots and bolts $b^{22}$ passing through the same, substantially as described.

2. In a side-seaming machine having a can-forming mandrel $b$ with a die-knife $c$ loosely mounted therein and resting upon pins $c'$ $c^2$, means for raising said knife-die and holding the same firmly in position during the formation of the seam, consisting of screw-rods $c^6$ $c^7$ mounted in a sliding beam $c^5$, and supporting said pins $c'$ $c^2$, links $c^{13}$ $c^{13}$ connecting said beam $c^5$ with ears $c^{14}$ attached to the rock-shaft $c^{12}$, segment-gear $c^{15}$ also attached to said rock-shaft and engaged by the rack $c^{10}$ operated by the cam-rod $c^4$ and cam $c^3$ substantially as described.

3. In a side-seaming machine having a can-forming mandrel $b$ and wings $b^3$ $b^4$ for wrapping a body-blank around said mandrel, means for holding said body-blank firmly against said mandrel during the formation of the seam, consisting of the bar $c^9$ screws $c^8$ $c^8$ adapted to lift said bar and mounted on sliding beam $c^5$ links $c^{13}$ $c^{13}$ connecting said beam $c^5$ with ears $c^{14}$ $c^{14}$ attached to rock-shaft $c^{12}$, segment-gear $c^{15}$ also attached to said rock-shaft and engaged by rack $c^{10}$ operated by cam-rod $c^4$ and cam $c^3$ substantially as described.

4. In a side-seaming machine having a die $d^8$ adapted to coöperate with a die $c$ in forming a locked seam, means for regulating the alinement of said die $d^8$ with said die $c$ consisting of parallel links $d^{10}$ $d^{10}$ pivoted to opposite ends of the link $d^7$ carrying said die $d^8$ and also at the opposite ends of said links $d^{10}$ to arms $e$ attached to the rock-shaft $e'$, one of said arms $e$ having an adjustable eccentric-pin $e^5$ working in a slot in the end of the corresponding link $d^{10}$, by the adjustment of which eccentric-pin the distance between that end of the die $d^8$ and the die $c$ is increased or diminished, substantially as described.

5. In a side-seaming machine having a tucker-die $f$ adapted to coöperate with a knife-die $c$ in forming a locked seam, means for regulating the alinement of said die $f$ with said die $c$, consisting of parallel links $f^3$ pivoted at one end to the sides of the frame $f'$ by which the die $f$ is carried and connected at the other with the eccentric-shaft $f^4$, in combination with the eccentric-shaft $f^4$ having at one end the adjustable eccentric $f^{10}$, one of said links $f^3$ embracing the main body of said shaft and the other the eccentric $f^{10}$, by the adjustment of which eccentric the corresponding end of the die $f$ is made to approach or recede from the die $c$ and means for adjusting the relative positions of the frame $f'$ to the links $f^2$ to conform to changes of adjustment of such eccentric substantially as described.

6. In a side-seaming machine having a tucker-die $f$ adapted to coöperate with a knife-die $c$ in forming a locked seam, means for regulating the distance between said dies consisting of an eccentric-shaft $f^4$ inserted in a socket in the frame of the machine and capable of rotation and adjustment therein, the projecting portion of said shaft being eccentric to the portion in said socket, in combination with parallel links $f^3$ pivoted at one end to the frame $f'$ by which the die $f$ is carried, the other end of said links being connected with the projecting portion of said eccentric-shaft $f^4$ substantially as described.

In testimony whereof I have signed my name to this specification in the presence of two subscribing witnesses.

CHARLES W. SLEEPER.

Witnesses:
O'NEIL TWITCHELL,
R. J. BROWN.